United States Patent [19]

Shibano et al.

[11] Patent Number: 4,624,893
[45] Date of Patent: Nov. 25, 1986

[54] PRESSURE-SENSITIVE ADHESIVE TAPES OR SHEETS

[75] Inventors: Tomishi Shibano, Tama; Itsuo Kimura, Tokyo; Hiroaki Nomoto, Tokyo; Sachio Maruchi, Tokyo, all of Japan

[73] Assignee: Sanyo Kokusaku-Pulp Co., Ltd., Tokyo, Japan

[21] Appl. No.: 700,173

[22] Filed: Feb. 11, 1985

[51] Int. Cl.$^4$ ............................. B32B 5/16; C09J 7/02
[52] U.S. Cl. .................................. 428/327; 428/336; 428/352; 428/354; 428/421; 428/422; 428/511; 428/537.5
[58] Field of Search ............... 428/352, 354, 343, 422, 428/421, 327, 532, 537.5, 511, 336

[56] References Cited

U.S. PATENT DOCUMENTS 4,513,059 4/1985 Dabroski .................... 428/352 X
4,514,457 4/1985 Sasaki ........................ 428/352 X Primary Examiner—Thomas J. Herbert
Attorney, Agent, or Firm—Oblon, Fisher, Spivak, McClelland & Maier

[57] ABSTRACT

An adhesive tape or sheet including a paper substrate, a release layer provided on at least one side of said substrate and comprising modified starch and/or starch and an organic fluorine compound, and an adhesive mass layer provided with respect to said release layer and containing a minute and spherical elastomer polymer, said adhesive mass layer having an adhesion of no more than 150 g/cm.

8 Claims, 7 Drawing Figures

PRESSURE-SENSITIVE ADHESIVE TAPES OR SHEETS

FIELD OF THE INVENTION

The present invention relates to a pressure-sensitive adhesive tape or sheet of relatively low adhesion.

BACKGROUND INFORMATION OF THE INVENTION

In general, the pressure-sensitive adhesive (hereinafter referred to as PSA) tapes or sheets are of the structure as illustrated in FIG. 1 or 2. More specifically, FIG. 1 is a schematically sectional view of a PSA tape or a PSA sheet free from any release liner, and FIG. 2 is a schematically sectional view of a PSA sheet including a release liner. In the drawings, reference numeral I is a PSA tape or sheet supporting substrate, II a release liner supporting substrate, III a PSA sheet surface member, IV a PSA layer, V a release layer, and VI is a release liner.

With the aforesaid PSA tapes or sheets, in most cases, silicone is generally used for the release layer thereof. However, the use of silicone offers the following problems:

(1) When the PSA mass used in the PSA tape or sheet has a relatively low adhesion (e.g., in the order of no more than 150 g/cm), the adhesive tape or sheet separates spontaneously from the release layer prior to the use thereof. This is due to excessive release properties of silicone. In consequence, the release layer loses its own function that it should protect the PSH layer may be contaminated.

(2) Difficulty is involved in marking the back surface of the PSA tape or the release (silicone)-treated surface of the PSA sheet free from any release liner with oil ink, water ink, ball-pointed pens, pencils, etc. due to their water- and oil-repellency.

It is noted that the release agents include, in addition to silicone, shellac, long-chain alkyl compounds, alkyd resin, etc. However, even when these agents are used, there is left much to be desired in respect of ink receptivity, although that receptivity is slightly improved, compared with the use of silicone. It is also difficult to obtain good releasability.

As a result of studies made to solve the aforesaid problems, it has been found that they are solved by a combination of modified starch and/or starch, which are used for the release layer in place of silicone, with PSA mass containing a minute and spherical elastomeric polymer, for which we have already filed a patent application (see a co-pending application Ser. No. 697,915, filed Feb. 4, 1985.

SUMMARY OF THE INVENTION

In consequence of later studies, it has also been found that the use of an organic fluorine compound with the modified starch and/or starch results in good ink receptivity and further improved release properties. In accordance with one aspect of the present invention, there is provided PSA tape or sheet including a paper substrate, a release layer provided on at least one side of said substrate and comprising modified starch and/or starch and an organic fluorine compound, and a PSA mass layer provided with respect to said release layer and containing a minute and spherical elastomeric polymer, said PSA tape or sheet having an adhesion of no more than 150 g/cm.

According to another aspect of the present invention, there is provided a PSA tape or sheet of the first aspect, wherein the main component of the adhesive mass has a glass transition temperature of no higher than $-50°$ C., as measured with DSC (differential scanning calorimeter).

The novel PSA tape or sheet according to the present invention possesses a suitable degree of releasability sufficient to prevent spontaneous separation thereof from the release layer, and has its release-treated surface to be appropriately marked with oil ink, water ink, ball-pointed pens, pencils, etc.

DETAILED DESCRIPTION OF THE INVENTION

Figure 1:
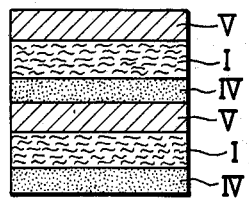
FIGS. 1 and 2 are schematical sections showing the prior art general PSA tapes or sheets.
Figure 2:
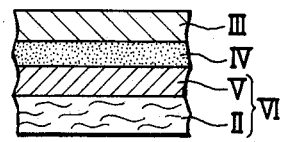

Referring now to FIGS. 3 to 7 inclusive showing the embodiments of the present invention, reference numeral 1 is an adhesive tape or sheet supporting paper substrate, 2 is a release liner supporting paper substrate, 3 an adhesive sheet surface member, 4 an adhesive layer containing an elastomeric polymer in the minute sphere form, 5 a release layer comprising modified starch and/or starch and an organic fluorine compound, and 6 is a release liner consisting of the paper substrate 2 and the release layer 5. A small letter a stands for an adhesive layer side, and b indicates a release layer side.

The release layer used in the present invention comprises modified starch and/or starch and an organic fluorine compound.

It is noted that the use of the organic fluorine compound with starch yields the following effects:

(I) It gives rise to more improved release properties which are difficult to attain with the modified starch and/or starch, and allows the PSA tape or sheet to be easily peeled off.

(II) Releasability is stably maintained during extended storage under aging conditions.

(III) Various releasability, levels are achieved depending upon the adhesive masses used by varying the amount of the organic fluorine compound.

It is noted that oil, water and other ink receptivity deteriorates, when organic fluorine compound is used alone. Its single use leads to excessive releasability, thus offering a problem.

In the present invention, alpha-starch, dextrin, oxidized starch, esterified starch, etherified starch and cationic starch are used alone or in combination as the modified starch. Among others, the most preference is given to oxidized starch and hydroxyethylated starch.

The organic fluorine compound used is soluble in water, and includes, for instance, water-soluble salts of perfluoroalkyl phosphates or perfluoroalkyl sulfonamide phosphates. Use may be also made of water soluble compounds such as perfluoroalkoxyalkyl carbamates, perfluoroalkyl monocarboxylic acid derivatives, perfluoroalkyl amines, etc., and polymers having as the skeleton acrylic acid, methacrylic acid, vinyl alcohols, epoxy, fumaric acid, etc., each having a $C_{6-12}$ fluorocarbon group.

The amount of the organic fluorine compound is no less than 0.5% by weight, preferably 1–80% by weight.

The release layer has a thickness of no less than 0.5 microns, preferably 1–5 microns.

The release layer may contain water resistant agents (for instance, urea-formaldehyde resin, melamine resin, methylol resin, glyoxal, polyaminoepichlorohydrin, etc.), stabilizers, barrier properties-improving agents (for example, PVA, acrylamide base resin, sodium alginate, CMC, etc.), anti-blocking agents, crosslinking agents, dyes and pigments, as long as they do not interfere with the function thereof.

It is required in the present invention that use be made of a PSA mass containing elastomeric polymer microspheres. If the PSA mass contains no minute and spherical elastomeric polymer, then it shows no good releasability to the modified starch, and starch organic fluorine compounds.

The PSA tape or sheet should have a normal-state adhesion of no more than 150 g/cm, as measured according to the stipulation of JIS Z1523. As an adhesion exceeding 150 g/cm, difficulty is encountered in the achievement of good releasability, and the supporting paper is easily peeled off.

The minute and spherical elastomeric polymer used includes polyacrylates, natural rubber, SBR, polyisoprene, polybutadiene, styrene/butadiene/acrylate ternary copolymers, etc. Preferably, that polymer has a mean particle size of 10 to 100 microns.

The main component of the adhesive mass has a glass transition temperature of no more than $-50°$ C., preferably $-70°$ C. to $-90°$ C. A glass transition temperature of higher than $-50°$ C. is undesired in respect of releasability.

In addition to the minute and spherical elastomeric polymer, the adhesive mass may contain polyacrylates, polyacrylic acid, SBR, styrene/acrylate copolymers, styrene/butadiene/acrylate ternary copolymers, polyvinyl acetate, gelatin, glue, casein, etc. alone or in combination. It is suitable that the amount of coating of the adhesive mass is 3 to 30 g/m² (calculated as solid matter).

Figure 3:
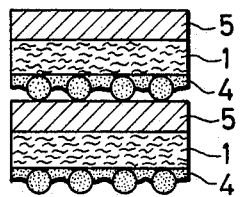
FIGS. 3 to 5 are schematical sections showing the typical PSA tapes or sheets according to the present invention (FIG. 3 showing two units to illustrate the PSA tape or the PSA sheet free from any release liner in a rolled-up state, FIG. 4 showing one unit of the adhesive sheet including an adhesive sheet, and FIG. 5 showing one release paper having adhesive sheets applied on both its sides)
Figure 4:
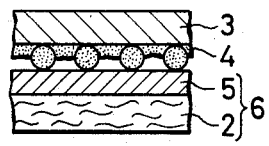
Figure 5:
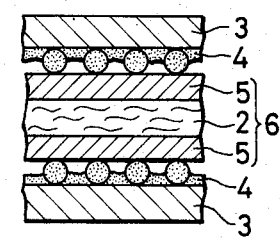
Figure 6:
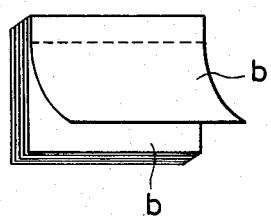
FIG. 6 is a schematical view showing one example of the adhesive sheet according to the present invention, i.e. an adhesive sheet in the form of a memo pad, wherein an adhesive mass is partly applied at the upper end.
Figure 7:
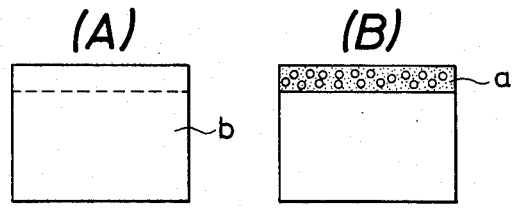
FIG. 7 is a plan view showing one side 7(A) and the other side 7(B) of the adhesive sheet of FIG. 6.

The adhesive mass may be coated entirely onto the application side, as shown in FIG. 3, or partly onto the application side, as illustrated in FIG. 7(B).

The paper used in the present invention may be that ordinarily used, such as wood free paper, kraft paper, glassine paper, inorganic fiber-filled paper, plastic-filled paper, etc.

It is noted that the aforesaid paper may previously be provided with an adhesion-improving layer for the purpose of improving adhesion of that paper to the adhesive mass.

The present invention will now be explained in further detail with reference to the following non-restrictive examples.

EXAMPLE 1

Wood free paper 1 of a weight of 78 g/m² was provided on one side with a release layer 5 (3 microns in thickness) comprising 80 parts by weight of phosphated starch and 20 parts by weight of a water-soluble salt of perfluoroalkyl phosphate, and was applied on the other side with an adhesive mass 4 (of 10 microns in thickness) containing a minute and spherical elastomeric polymer based on polyacrylate, thereby to obtain an PSA tape having an adhesion of 60 g/cm. With this tape having a moderate degree of releasability, no spontaneous separation of the adhesive surface from the release layer took place. That tape could easily be extended in a normal state or after heat aging (24 hours at 70° C.) without causing peeling-off of the supporting paper. The tape could also be marked on the back side with Magic ink, water ink, ball-pointed pens, pencils, etc.

COMPARISON EXAMPLE 1

A PSA tape was prepared according to Example 1, provided that the phosphated starch alone was used for the release layer and was heat-aged at 70° C. for 24 hours. As a result, it has been found that its extension was not easy even with a considerable peeling force.

COMPARISON EXAMPLE 2

A PSA tape was prepared according to Example 1, provided that only a water-soluble salt of perfluoroalkyl phosphate was used for the release layer. It has been found that Magic ink and water ink are repelled on the back surface of this tape.

Table 1 sets for the results of Example 1 and comparison Examples 1 and 2.

TABLE 1

| | Extensibility | | Ink Receptivity | |
|---|---|---|---|---|
| | Nomal State | After Heat Aging | Oily Magic Ink | Water Ink |
| Example 1 | ◎ | ◎ | ◎ | ◎ |
| Comparative Example 1 | ◎ | Δ | ◎ | ◎ |
| Comparative Example 2 | x~Δ | — | x | x |

The measuring methods applied in the present invention are given below:
(1) ADHESION: According to the normal-state adhesion measuring method as stipulated in JIS Z 1523.
(2) MEASUREMENT OF GLASS TRANSITION TEMPERATURE WITH DSC:
   The glass transition temperature was measured under the following conditions with a low-temperature type differential scanning calorimeter, manufactured by Rikagaku Denki K. K.
   Amount of Sample: 18–20 mg
   Pan: Aluminium
   Atmosphere: Air
   Heating Rate: 10° C./min
   Reference substance: Alumina
(3) EXTENSIBILITY: Extensibility was measured by heat-aging the tape samples at normal temperature or 70° C. for 24 hours, and extending them at a rate of 40 m/min. The occurrence of peeling-off of the paper substrates was also investigated.

What is claimed is:
1. A pressure-sensitive adhesive tape or sheet including a paper substrate, a release layer provided on at least one side of said substrate and comprising modified starch or starch and a water-soluble organic fluorine compound selected from the group consisting of water-soluble salts of perfluoroalkyl phosphates, perfluoroalkyl sulfonamide phosphates, perfluoroalkoxyalkyl carbamates, perfluoroalkyl monocarboxylic acid derivatives, perfluoroalkylamines, and polymers having as a skeleton acrylic acid, methacrylic acid, vinyl alcohols, epoxy, fumaric acid, wherein each of said polymers contains a $C_6$–$C_{12}$ fluorocarbon group on a repeating unit of the polymer, and an adhesive mass layer provided with respect to said release layer and containing a minute and spherical elastomeric polymer, said PSA tape or sheet having an adhesion of no more than 150 g/cm.

2. The pressure-sensitive adhesive tape or sheet according to claim 1, wherein said modified starch or starch is selected from the group consisting of α-starch, dextrin, oxidized starch, esterified starch, etherified starch, cationic starch, hydroxyethylated starch and mixtures thereof.

3. The pressure-sensitive adhesive tape or sheet of claim 1, wnerein the release layer has a thickness of no less than 0.5 microns.

4. A pressure-sensitive adhesive tape or sheet of claim 1, wherein the release layer has a thickness of 1 to 5 microns.

5. The pressure-sensitive adhesive tape or sheet of claim 1, wherein the amount of the organic fluorine compound is no less than 0.5% by weight of said release layer.

6. The pressure-sensitive adhesive tape or sheet of claim 1, wherein the amount of the organic fluorine compound is 1 to 80% by weight of said release layer.

7. The tape or sheet as claimed in claim 1, wherein the main component of said adhesive mass has a glass transition temperature of no higher than $-50°$ C., as measured with DSC (differential scanning calorimeter).

8. A pressure-sensitive adhesive tape or sheet of claim 7, wherein the glass transition temperature is from $-70°$ C. to $-90°$ C.

* * * * *